(12) United States Patent
Hetherington et al.

(10) Patent No.: US 7,003,917 B2
(45) Date of Patent: Feb. 28, 2006

(54) LIFT HANDLE FOR PRODUCTS HAVING A NAILING FIN

(75) Inventors: Richard W. Hetherington, Bend, OR (US); Daniel G. Marston, Kellogg, IA (US)

(73) Assignee: JELD-WEN, Inc., Klamath Falls, OR (US)

( * ) Notice: Subject to any disclaimer, the term of this patent is extended or adjusted under 35 U.S.C. 154(b) by 201 days.

(21) Appl. No.: 10/670,962

(22) Filed: Sep. 25, 2003

(65) Prior Publication Data
US 2005/0066580 A1 Mar. 31, 2005

(51) Int. Cl.
*E04G 21/16* (2006.01)

(52) U.S. Cl. ............... 52/122.1; 52/749.1; 49/380; 294/15

(58) Field of Classification Search ........... 49/460, 49/380; 206/325; 16/422, 412, 413; 52/122.1, 52/749.1; 292/DIG. 27; 294/15, 16
See application file for complete search history.

(56) References Cited

U.S. PATENT DOCUMENTS

| | | | | |
|---|---|---|---|---|
| 3,514,904 A | * | 6/1970 | Riegelman | 49/460 |
| 4,156,794 A | * | 5/1979 | Robinson | 174/16.1 |
| 4,780,998 A | * | 11/1988 | Knapp | 52/211 |
| 4,815,246 A | * | 3/1989 | Haas | 52/207 |
| 5,323,511 A | * | 6/1994 | Gray | 16/422 |
| 5,324,085 A | * | 6/1994 | Hintz, Jr. | 294/16 |
| 5,365,631 A | * | 11/1994 | Emerick | 15/105 |
| 5,511,285 A | * | 4/1996 | Bush et al. | 16/422 |
| 5,603,403 A | * | 2/1997 | Sather | 206/325 |
| 5,732,442 A | * | 3/1998 | Haggard | 16/422 |
| 6,345,416 B1 | * | 2/2002 | Vollmar | 16/413 |

OTHER PUBLICATIONS

LCS Precision Molding, Website Home Page © 2001, 2002, 2003.
LCS Precision Molding, LCSR2468 Lift Handle © 2001, 2002, 2003.
LCS Precision Molding, Product Feature © 2001, 2002, 2003.

* cited by examiner

Primary Examiner—Gregory J. Strimbu
(74) Attorney, Agent, or Firm—Nelson, Mullins, Riley & Scarborough, LLP

(57) ABSTRACT

A lift handle for building systems such as door assemblies and window assemblies. The handle comprising a flange and a channel disposed proximate the flange. The flange comprises a first surface and a second surface. The first surface is adapted to be coupled with the frame of the door or window assembly and the channel is adapted to be coupled with a nailing fin of the frame for moving the frame via the nailing fin.

14 Claims, 6 Drawing Sheets

LIFT HANDLE FOR PRODUCTS HAVING A NAILING FIN

FIELD OF THE INVENTION

This invention relates generally to lift handle products and processes for building systems, and more particularly to lift handles for doors and windows.

BACKGROUND

Door and window assemblies are commonly sold in retail settings. These doors and windows can be large, heavy, and cumbersome to handle and transport. Devices and methods that facilitate the handling and transportation of such doors and windows by customers and sales staff can reduce physical strain on individuals, as well as reduce damage to these goods.

Plastic handles that attach directly to wooden doors and windows can be used to transport wooden doors and windows. One such handle is manufactured by LCS Precision Molding and is marketed as LCSR2466 Lift Handle. Generally, a pair of such plastic handles is screwed directly onto opposing sides of a frame of a wooden door. The jamb on a wooden door is typically hidden inside a wall when installed in a building structure. Thus, several screw holes in a wooden frame remaining after the handles have been removed are of little consequence to the structural integrity or appearance of the wooden door or window.

Many door and window assemblies, however, are made of vinyl rather than wood. The handles described above that can be attached directly to wooden doors and windows cannot be used on vinyl doors and windows without marring the outward, finished appearance or adversely affecting the structural integrity of vinyl doors and windows. Thus, vinyl doors and windows sold in a retail setting generally include wooden framing on top of or around the door on which to attach a handle.

Such framing for doors and windows, however, increases the cost and weight of the door or window. The increased cost can be attributed to the extra packaging materials required as well as additional manufacturing steps and labor involved in applying the additional packaging to the doors and windows. Additionally, the purchaser expends additional time and labor to remove the packaging. Moreover, this additional packaging typically is not recycled, and thus, increases waste, which likely is ultimately disposed of in a landfill.

What is needed are products and processes that can improve the handling and transportation of door and window assemblies.

SUMMARY

The present invention comprises products and processes for lift handles for building systems, such as door and window assemblies. In one exemplary embodiment, an apparatus comprises a flange and a channel disposed proximate the flange. The flange comprises a first surface and a second surface. The first surface is adapted to be coupled with a frame. The channel is adapted to be coupled with a fin of the frame. Such products and processes may be used with building systems made of any particular material, including vinyl and wood.

In another exemplary embodiment, a system comprises a frame and a handle. The frame comprises a fin. The handle comprises a flange comprising a first surface and a second surface and a channel disposed proximate the flange. The first surface is adapted to be coupled with a frame. The channel is adapted to be coupled with a fin of the frame.

In yet another exemplary embodiment, a method comprises providing a flange and providing a channel disposed proximate the flange. The flange comprises a first surface and a second surface. The first surface is adapted to be coupled with the frame. The channel is adapted to be coupled with a fin of the frame.

In a further embodiment, a method of coupling a handle with a frame comprises coupling a channel with a fin of the frame. The handle comprises a flange comprising a first surface and a second surface. The channel is disposed proximate the flange.

An advantage of the present invention can be to provide a reversible or ambidextrous handle.

Another advantage of the present invention can be to provide a handle that can be directly attached to a door or window assembly without damaging an outer, visible surface.

Yet another advantage of the present invention can be to provide a handle that can be re-used or recycled.

Still another advantage of the present invention can be to reduce an amount of packaging for doors and windows used to transport the doors and windows.

Still another advantage of the present invention can be to provide a handle that can be removed easily from a door or window assembly.

These exemplary embodiments are mentioned not to summarize the invention, but to provide an example of an embodiment of the invention to aid understanding. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate the embodiments of the invention. In the drawings, like numerals are used to indicate like elements throughout.

DETAILED DESCRIPTION

Figure 1:
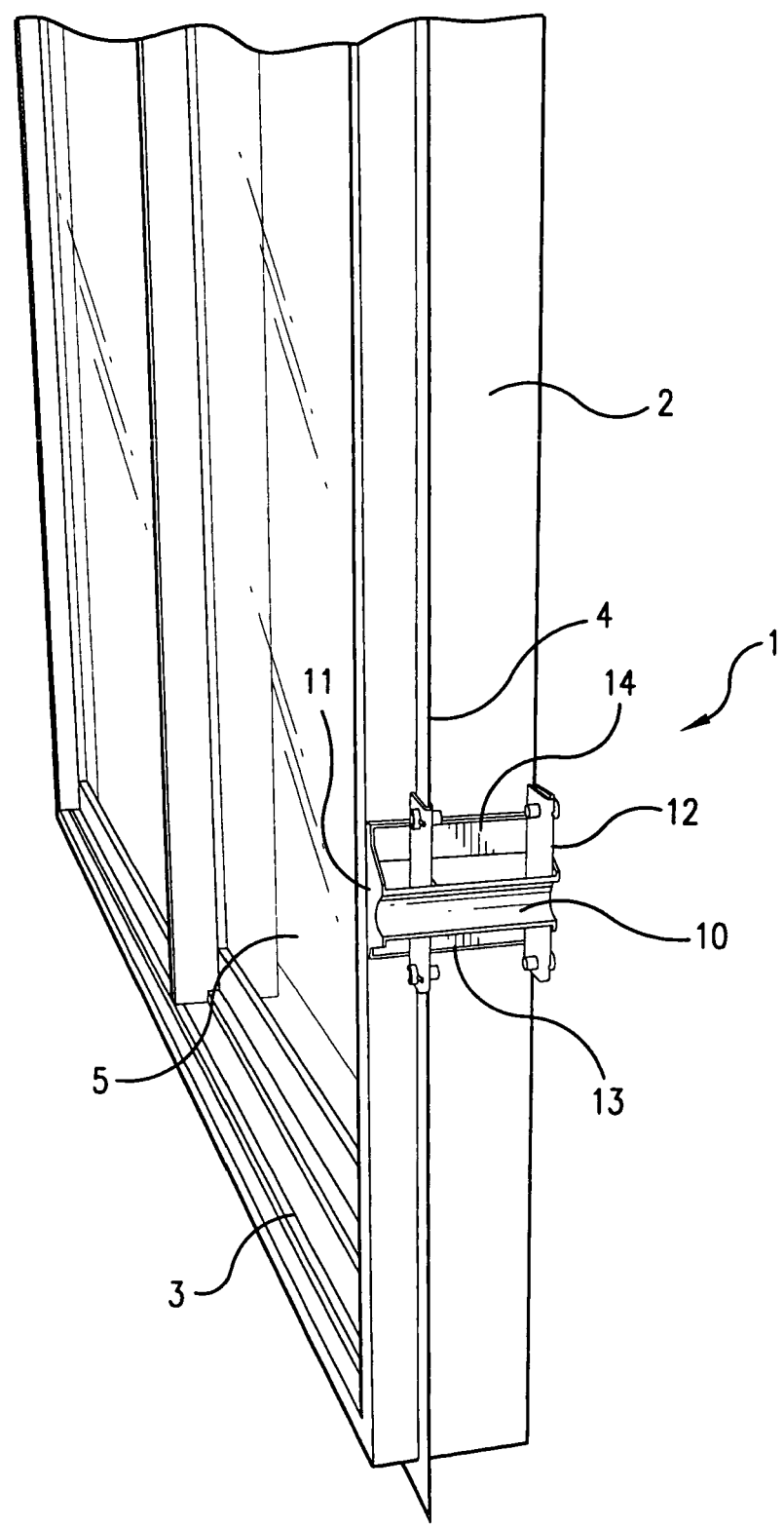
FIG. 1 is a perspective view of a system according to an embodiment of the invention.

Embodiments of the present invention comprise products and processes for forming lifting devices for building systems, such as window and door assemblies. Referring now to FIG. 1, a perspective view of one door assembly 1 according to the principles of the present invention is shown. The door assembly 1 shown comprises a plurality of frame members, such as a stile 2 and a rail 3, which form a perimeter defining a rectangular-like shape. Alternatively, other suitable shapes can be used, such as square, polygonal, or arcuate shapes. In one embodiment, the door assembly 1 comprises a vinyl door assembly. In an alternate embodiment, the assembly comprises a vinyl window assembly. Alternatively, other suitable materials for the door assembly 1 can be used.

In the embodiment shown, there are at least two substantially parallel stiles 2 and at least two substantially parallel rails 3. Also, the stiles 2 are disposed substantially perpendicular to the rails 3. The stiles 2 and the rails 3 forming the door assembly 1 define a pane 5, in which a sheet of glass or other suitable transparent material is disposed.

Disposed along the perimeter of the door assembly 1 is a nailing fin 4. Typically, the nailing fin 4 secures the door assembly 1 to a structural member or frame of a building structure. Generally, fasteners, such as nails, are driven through the nailing fin 4 and into the structural members of the building structure. In one embodiment, orifices are formed in the nailing fin 4 to accommodate the fasteners.

In one embodiment, the nailing fin 4 is disposed along the entire perimeter of door assembly 1. In another embodiment, the nailing fin 4 is disposed along a portion of the door assembly 1. Preferably, the nailing fin 4 is formed integrally with the stiles 2 and rails 3. Alternatively, the nailing fin 4 is formed separately from the door assembly 1 and attached to the stiles 2 and rails 3 using suitable means, such as for example, using adhesives or fasteners.

Preferably, a handle 10 is coupled to the door assembly 1. The handle 10 is preferably used to facilitate an individual's grasping, lifting, handling, and transporting of the door assembly 1. The positioning of the handle 10 varies according to the size, shape, and weight of the door assembly 1. Thus, the position of the handle 10 is not limited to that shown in FIG. 1. Additionally, although only one handle 10 is shown, more than one handle 10 can improve an individual's manipulation of the door assembly 1.

Figure 2:
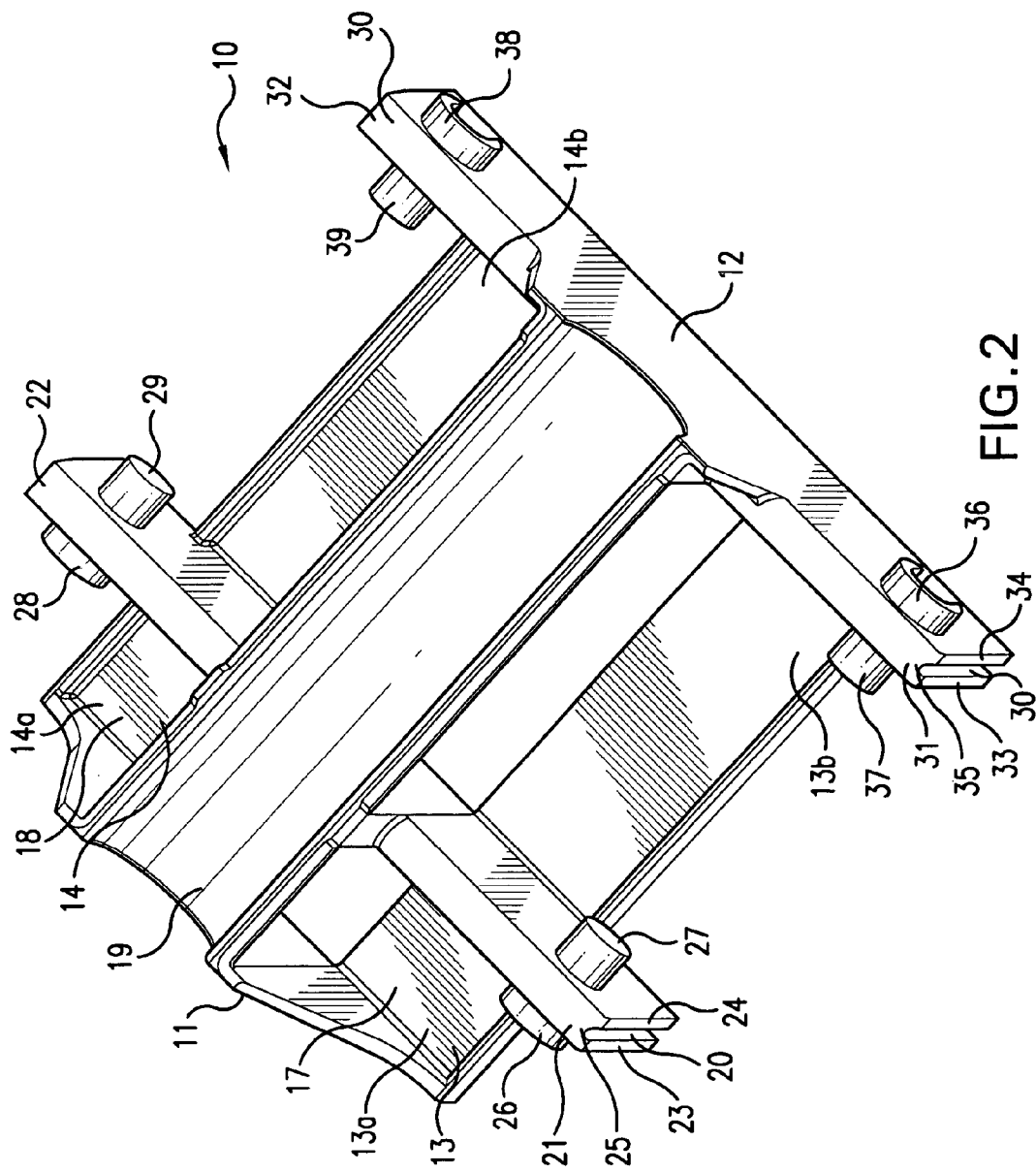
FIG. 2 is a perspective view of the handle of FIG. 1.
Figure 3:
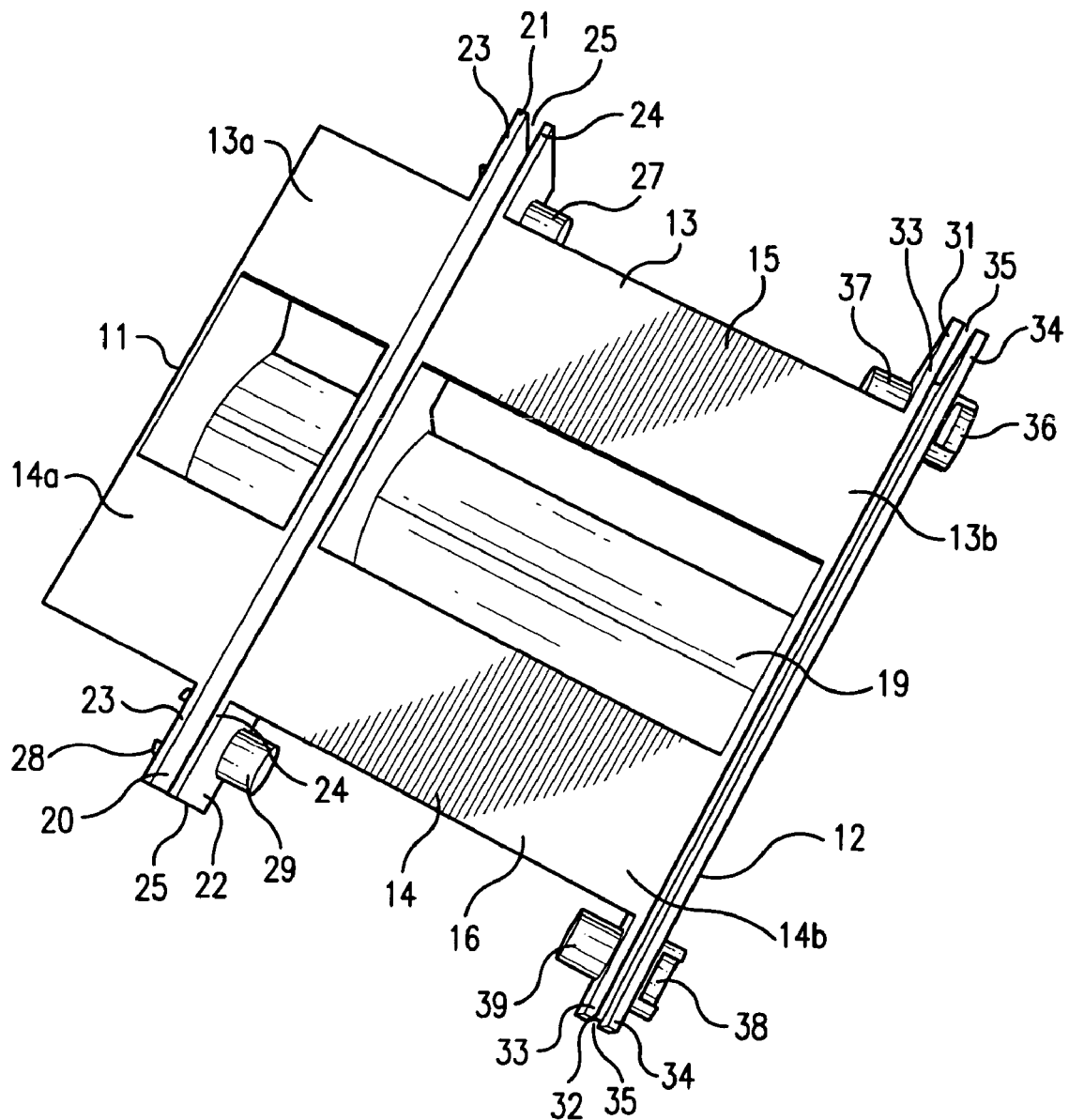
FIG. 3 is another perspective view of the handle of FIG. 1.

Referring now to FIGS. 2 and 3, one embodiment of a handle 10 according to the present invention is shown. Typically, the handle 10 is made of a plastic material and is injection molded and formed as a unitary member. Alternatively, the handle 10 can be formed of other suitable materials and of separate components and coupled together by suitable means.

Preferably, the handle 10 comprises a first end 11 and a second end 12. The second end 12 is disposed in facing opposition to the first end 11. Disposed between the first and second ends 11,12 is a first flange 13. In one embodiment, the first flange 13 comprises a first end 13a and a second end 13b. The second end 13b is disposed in facing opposition to the first end 13a.

Preferably, the first flange 13 comprises a first surface 15 and a second surface 17. Generally, the first and second surfaces 15,17 are disposed in facing opposition and are substantially parallel to one another. Alternatively, the first and second surfaces 15,17 are disposed in other suitable configurations. In one embodiment, the first flange 13 comprises a substantially rectangular shape. Alternatively, other suitable shapes can be used for the first flange 13.

The first surface 15 is adapted to be coupled to the frame—preferably the stile 2—of the door assembly 1. Preferably, when coupled to the frame, the first surface 15 is disposed substantially adjacent to the frame. In one embodiment, the first surface 15 is disposed substantially contiguous to the frame.

Disposed between the first and second ends 11,12 is a second flange 14. In one embodiment, the first and second flanges 13,14 comprise a single, unitary flange. Other suitable configurations can be used. In one embodiment, the first and second flanges 13,14 are disposed substantially parallel to and coplanar with one another.

In one embodiment, the second flange 14 comprises a first end 14a and a second end 14b. The second end 14b is disposed in facing opposition to the first end 14a. Preferably, the second flange 14 comprises a first surface 16 and a second surface 18. Generally, the first and second surfaces 16,18 are disposed in facing opposition and are substantially parallel to one another. Alternatively, the first and second surfaces 16,18 are disposed in other suitable configurations. In one embodiment, the second flange 14 comprises a substantially rectangular shape. Alternatively, other suitable shapes can be used for the second flange 14.

The first surface 16 is adapted to be coupled to the frame—preferably the stile 2—of the door assembly 1. Preferably, when coupled to the frame, the first surface 16 is disposed substantially adjacent to the frame. In one embodiment, the first surface 16 is disposed substantially contiguous to the frame.

Preferably, the handle 10 comprises a first channel 20. The first channel 20 is adapted to be coupled with the nailing fin 4 of the door assembly 1. In one embodiment, the first channel 20 is adapted to receive the nailing fin 4. Preferably, the first channel 20 is disposed proximate the first and second flanges 13,14. In one embodiment, the first channel 20 is disposed proximate the first end 13a of the first flange and the second end 14a of the second flange 14. Generally, the first channel 20 is disposed substantially orthogonal to the first and second flanges 13,14.

The first channel 20 comprises a first end 21 and the second end 22. The first and second ends 21,22 of the first channel 20 are disposed on opposing sides of the first channel 20. The first channel 20 spans substantially continuously from the first end 21 to the second end 22.

The first channel 20 comprises a slot or a groove formed by a first leg 23, a second leg 24, and an intermediate portion 25. The intermediate portion 25 joins the first and second legs 23,24, which are substantially parallel to one another. One side view of the first channel 20 formed by the first leg 23, the second leg 24, and the intermediate portion 25 substantially resembles an elongated u-shape.

A depth of the first channel 20 is sufficient to engage a portion of the nailing fin 4, such that the door assembly 1 can be effectively manipulated by an individual grasping the handle 10. Alternatively, other suitable configurations for the first channel 20 can be used.

In one embodiment, the first channel 20 comprises means for securing the nailing fin 4. Preferably, the securing means is provided in both the first and second ends 21,22 of the first channel 20. The securing means comprises a first receiving member 26 coupled with the first leg 23 and a first shaft 27 coupled with the second leg 24. Preferably, the first receiving member 26 and the first shaft 27 are formed as integral elements of the handle 10. Alternatively, the first receiving member 26 and the first shaft 27 can be formed separately and coupled with the handle 10.

The first receiving member 26 is adapted to receive a head of a self-tapping screw (not shown). The first shaft 27 is a generally cylindrical-shaped solid portion formed of the same material as the handle 10. Typically, the first shaft 27 is disposed along an axis common with that of the receiving member.

Preferably, the handle 10 is secured to the nailing fin 4, and thus the door assembly 1, by engaging a self-tapping screw through first leg 23, through a portion of the nailing fin 4 disposed in the first channel 20, and into the first shaft 27. Alternatively, other suitable securing means can be used, such as rivets, adhesives, and friction fits.

The securing means also comprises a second receiving member 28 and a second shaft 29, which are disposed proximate the second end 22. A detailed description of the second receiving member 28 and the second shaft 29 is not provided, as the configuration and function of the second receiving member 28 and the second shaft 29 are similar to that described above with reference to the first receiving member 26 and the first shaft 27.

As best shown in FIG. 3, the first channel 20 intersects the first and second flanges 13,14. Thus, the first channel 20 forms a distinct first end 13a and a distinct second end 13b of the first flange 13 and a distinct first end 14a and a distinct second end 14b of the second flange 14.

In one embodiment, the handle 10 comprises a second channel 30. The second channel 30 is provided to accommodate varying door assembly configurations, including, for example, using the handle 10 for either left-hand or right-hand door or window assembly configurations or mirror-image door or window assembly configurations. Thus, the second channel 30 permits using a single handle 10 for a variety of door or window assembly configurations rather than using a specific handle for a pre-determined door or window assembly configuration.

The second channel 30 is disposed proximate the second end 12 of the handle 10. In one embodiment, the second channel 30 is contiguous to the second end 12 of the handle 10. Preferably, the second channel 30 is disposed proximate the second ends 13b,14b of the first and second flanges 13,14. In one embodiment, the second channel 30 is disposed adjacent to the second ends 13b,14b of the first and second flanges 13,14. Preferably, the second channel 30 is disposed substantially parallel with the first channel 20, and thus, substantially orthogonal to the first and second flanges 13,14.

The second channel 30 comprises a first end 31 and a second end 32. The first and second ends 31,32 of the second channel 30 are disposed on opposing sides of the second channel 30. The second channel 30 spans substantially continuously from the first end 31 to the second end 32.

The second channel 30 comprises a slot or a groove formed by a first leg 33, a second leg 34, and an intermediate portion 35. The intermediate portion 35 joins the first and second legs 33,34, which are substantially parallel to one another. One side view of the second channel 30 formed by the first leg 33, the second leg 34, and the intermediate portion 35 substantially resembles an elongated u-shape.

The second channel 30 is adapted to be coupled with the nailing fin 4 of the door assembly 1. In one embodiment, the second channel 30 is adapted to receive the nailing fin 4. A depth of the second channel 30 is sufficient to engage a portion of the nailing fin 4, such that the door assembly 1 can be effectively manipulated by an individual grasping the handle 10. Alternatively, other suitable configurations for the second channel 30 can be used.

In one embodiment, the second channel 30 comprises means for securing the nailing fin 4. Preferably, the securing means is provided in both the first and second ends 31,32 of the second channel 30. The securing means comprises a first receiving member 36 coupled with the second leg 34 and a first shaft 37 coupled with the first leg 33. Preferably, the first receiving member 36 and the first shaft 37 are formed as integral elements of the handle 10. Alternatively, the first receiving member 36 and the first shaft 37 can be formed separately and coupled with the handle 10.

The first receiving member 36 is adapted to receive a head of a self-tapping screw (not shown). The first shaft 37 is a generally cylindrical-shaped solid portion formed of the same material as the handle 10. Typically, the first shaft 37 is disposed along an axis common with that of the receiving member 36.

As described above, the nailing fin 4 is typically disposed in either the first channel 20 or the second channel 30. Thus, only the channel in which the nailing fin 4 is disposed is the securing means utilized. Where the nailing fin 4 is disposed in the second channel 30, the handle 10 is preferably secured to the nailing fin 4, and thus the door assembly 1, by engaging a self-tapping screw through second leg 34, through a portion of the nailing fin 4 disposed in the second channel 30, and into the first shaft 37. Alternatively, other suitable securing means can be used, such as rivets, adhesives, and friction fits.

The securing means also comprises a second receiving member 38 and a second shaft 39, which are disposed proximate the second end 32. A detailed description of the second receiving member 38 and the second shaft 39 is not provided, as the configuration and function of the second receiving member 38 and the second shaft 39 are similar to that described above with reference to the first receiving member 36 and the first shaft 37.

Preferably, the handle 10 comprises a grip 19. The grip 19 is adapted to be grasped by an individual or a suitable grasping or attaching device, such as for example, a hook or a tied rope. In the embodiment shown in FIG. 2, one view or cross-section of the grip 19 is substantially hemispherical-shaped. The grip 19 also may include pre-formed ridges (not shown) or grooves (not shown) to improve grasping by a hand or attachment by a device.

The grip 19 is preferably formed of the same material and as a unitary element of the handle 10. Alternatively, the grip 19 can be formed of other suitable materials and separate from the handle 10, and attached to the handle 10 using suitable attaching means.

Preferably, the grip 19 is disposed substantially orthogonal to the first channel 20. In one embodiment, the grip 19 extends substantially continuously from the first end 11 to the second end 12 of the handle 10. The grip 19 comprises a first end 19a and a second end 19b. Preferably, the first end 19a is coupled with the first end 11 of the handle 10 and the second end 19b is coupled with the second end 12 of the handle 10.

In one embodiment, a portion of the grip 19 is coupled with the intermediate portion 25 of the first channel 20 and with the intermediate portion 35 of the second channel 30. Alternatively, other suitable configurations can be used to provide the grip 19 with sufficient dimensional stability to effectively manipulate the door assembly 1.

Figure 4:
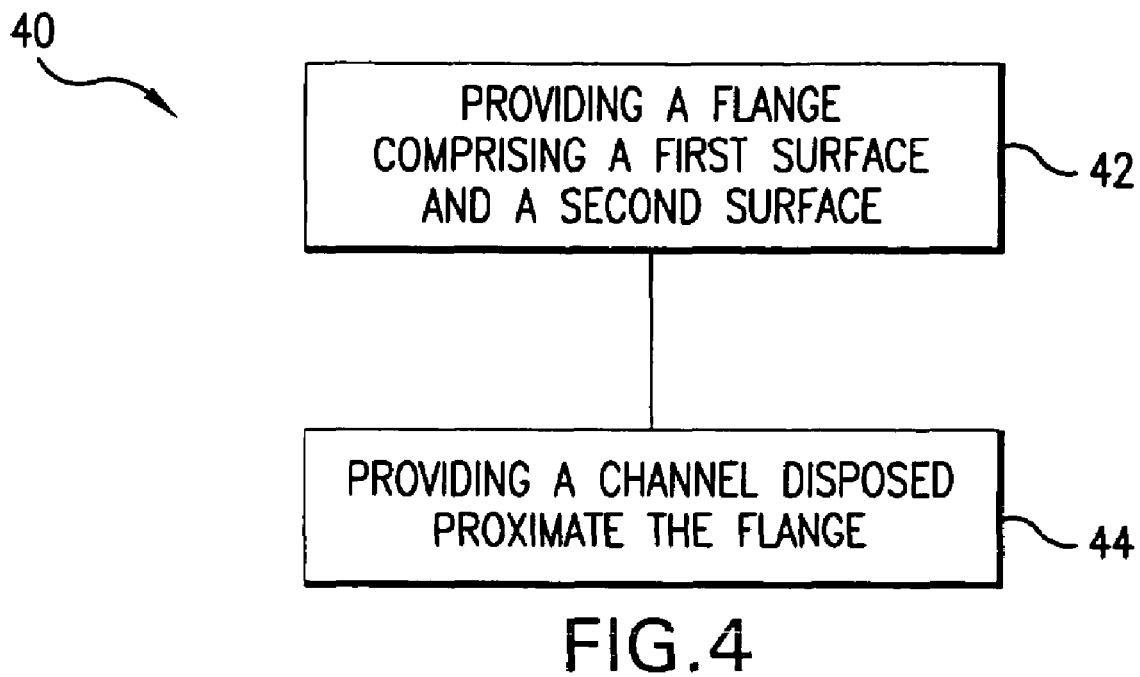
FIG. 4 is a block diagram of a method according to the invention.

Referring now to FIG. 4, a method 40 according to an embodiment of the present invention is shown. The method 40 may be used to form the handle 10 for use with the door assembly 1, as described above. However, the method 40 may be used to form other handles for use with the door assembly 1 or with other door or window assemblies. Items shown in FIGS. 1–3, as well as the description above, are referred to in describing FIG. 4 to aid understanding of the embodiment of the method 40 shown.

As indicated by block 42, the method 40 comprises providing a flange comprising a first surface and a second surface. The first surface is adapted to be coupled with a frame. In one embodiment, the flange is similar to that described above and with reference to FIGS. 1–3. Alternatively, other suitable flanges can be used. In one embodiment, the frame comprises a vinyl door frame. In another embodiment, the frame comprises a vinyl window frame. In one embodiment, the frame is similar to that described above and with reference to FIG. 1. Alternatively, other suitable frames can be used.

As indicated by block 44, the method 40 comprises providing a channel disposed proximate the flange. Preferably, the channel is adapted to be coupled with a fin of the frame. In one embodiment, the channel is adapted to receive the fin. Preferably, the channel comprises a first end and a second end. In one embodiment, the channel is similar to that described above and with reference to FIGS. 1–3. Alternatively, other suitable channels can be used. In one embodiment, the fin comprises a nailing fin, and is similar to that described above and with reference to FIG. 1. Alternatively, other suitable fins can be used.

In one embodiment, the flange comprises a first end and a second end. In one embodiment, the channel is disposed proximate the first end of the flange. In another embodiment, the channel is disposed substantially orthogonal to the flange.

In one embodiment, the method 40 further comprises providing means for securing the channel and the fin. Preferably, the securing means is similar to that described above and with reference to FIGS. 1–3. Alternatively, other suitable securing means can be used.

Generally, the method 40 comprises providing a grip. Preferably, the grip is disposed substantially orthogonal to the channel. Alternatively, the grip is disposed in other suitable configurations, such that the assembly is effectively manipulated. In one embodiment, the grip is similar to that described above and with reference to FIGS. 1–3. Alternatively, other suitable grips can be used.

In an alternate embodiment, the channel comprises a first channel. In this alternate embodiment, the method 40 further comprises providing a second channel. Preferably, the second channel is disposed proximate the second end of the flange, and substantially parallel to the first channel. The second channel is adapted to be coupled with the fin. In one embodiment, the second channel is similar to that described above and with reference to FIGS. 1–3. Alternatively, other suitable second channels can be used.

Figure 5:
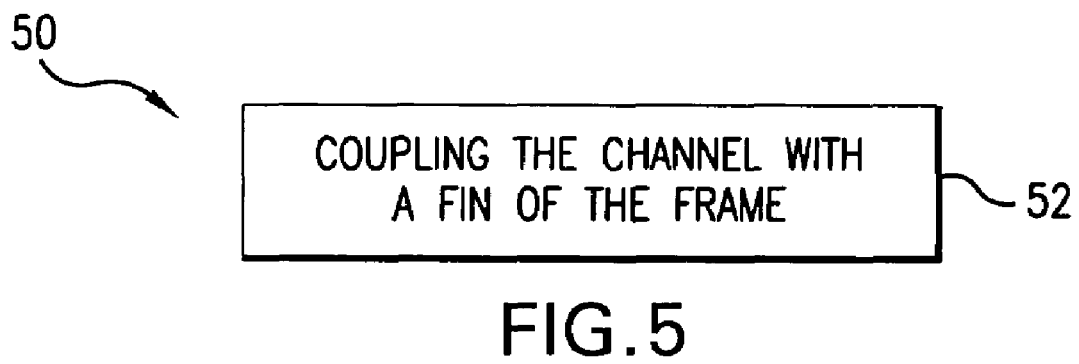
FIG. 5 is a block diagram of a method according to another embodiment of the invention.

Referring now to FIG. 5, a method 50 according to an embodiment of the present invention is shown. The method 50 may be used to couple a handle with a frame, as described above. In one embodiment, the frame comprises a vinyl door frame. In another embodiment, the frame comprises a vinyl window frame. Alternatively other suitable frames can be used.

Items shown in FIGS. 1–3, as well as the description above, are referred to in describing FIG. 5 to aid understanding of the embodiment of the method 50 shown. However, the method 50 is not limited to the embodiments shown in FIGS. 1–3 and those described above.

Preferably, the handle comprises a flange comprising a first surface and a second surface. Also preferably, a channel is disposed proximate the flange. In one embodiment, the channel and the flange are similar to that described above and with reference to FIGS. 1–3. Alternatively, other suitable channels and flanges can be used.

As indicated by block 52, the method 50 comprises coupling the channel with a fin of the frame. Preferably, the fin comprises a nailing fin. In one embodiment, the channel is manually positioned and coupled with the fin. Generally, the channel is disposed adjacent to a portion of the fin. Alternatively, portions of the channel are disposed substantially contiguous to the fin.

In one embodiment, the method comprises coupling the first surface of the channel with the frame and securing the fin of the frame in the channel of the handle. Generally, the first surface of the channel is manually positioned and coupled with a portion of a surface of the frame. Typically, the first surface of the channel is disposed adjacent to the surface of the frame. Alternatively, portions of the first surface of the channel are disposed substantially contiguous to portions of the surface of the frame.

Generally, the fin of the frame is secured in the channel of the handle. Preferably, the fin is secured to the handle similar to that described above, and with reference to FIGS. 1–3. Alternatively, other suitable methods of securing the fin to the handle can be used, such as for example, riveting the fin and the channel together, using a friction fit between the fin and the channel, or applying an adhesive to bond portions of the fin and the channel together.

Figure 6:
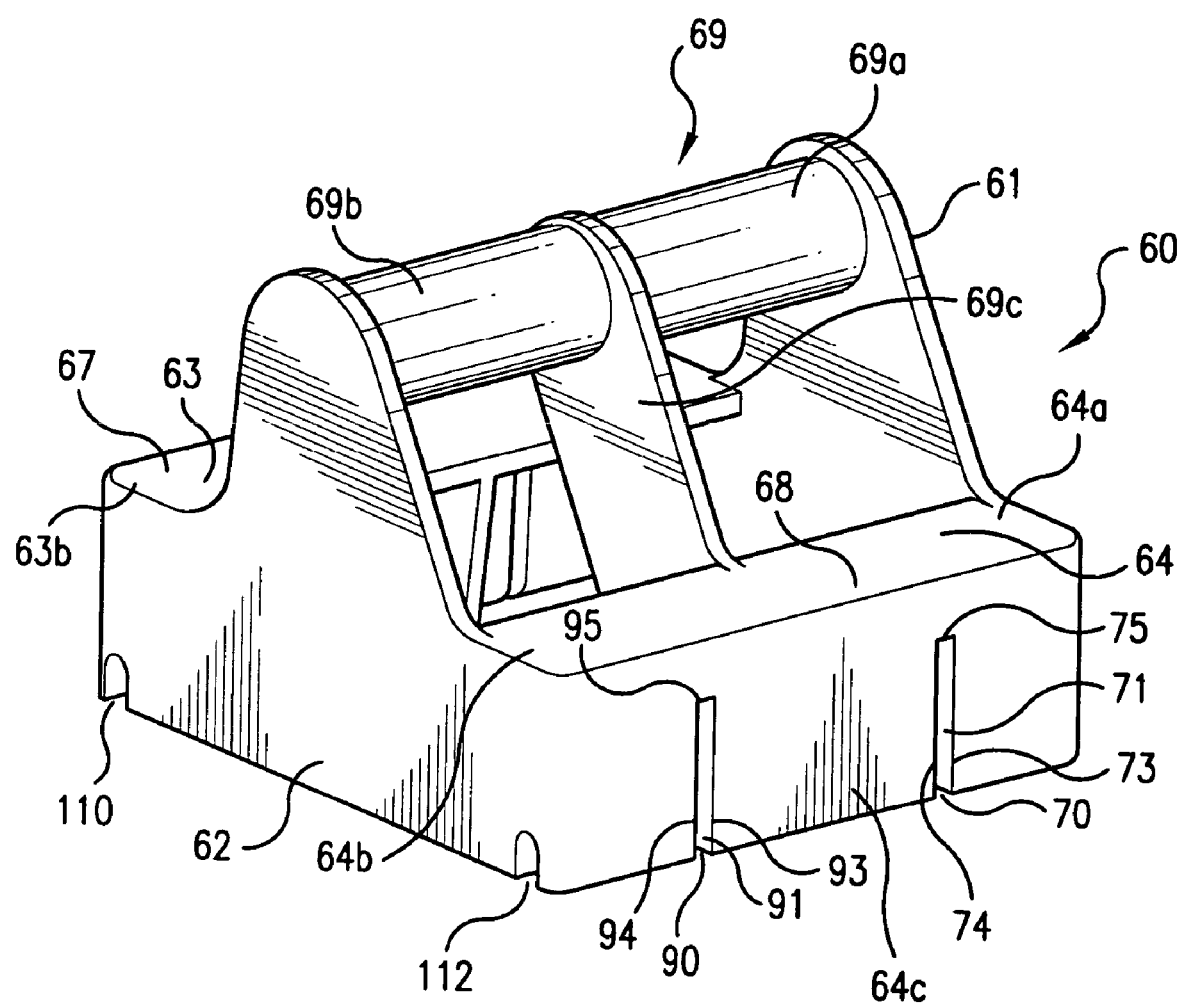
FIG. 6 is a perspective view of an alternate embodiment of a handle according to the present invention.
Figure 7:
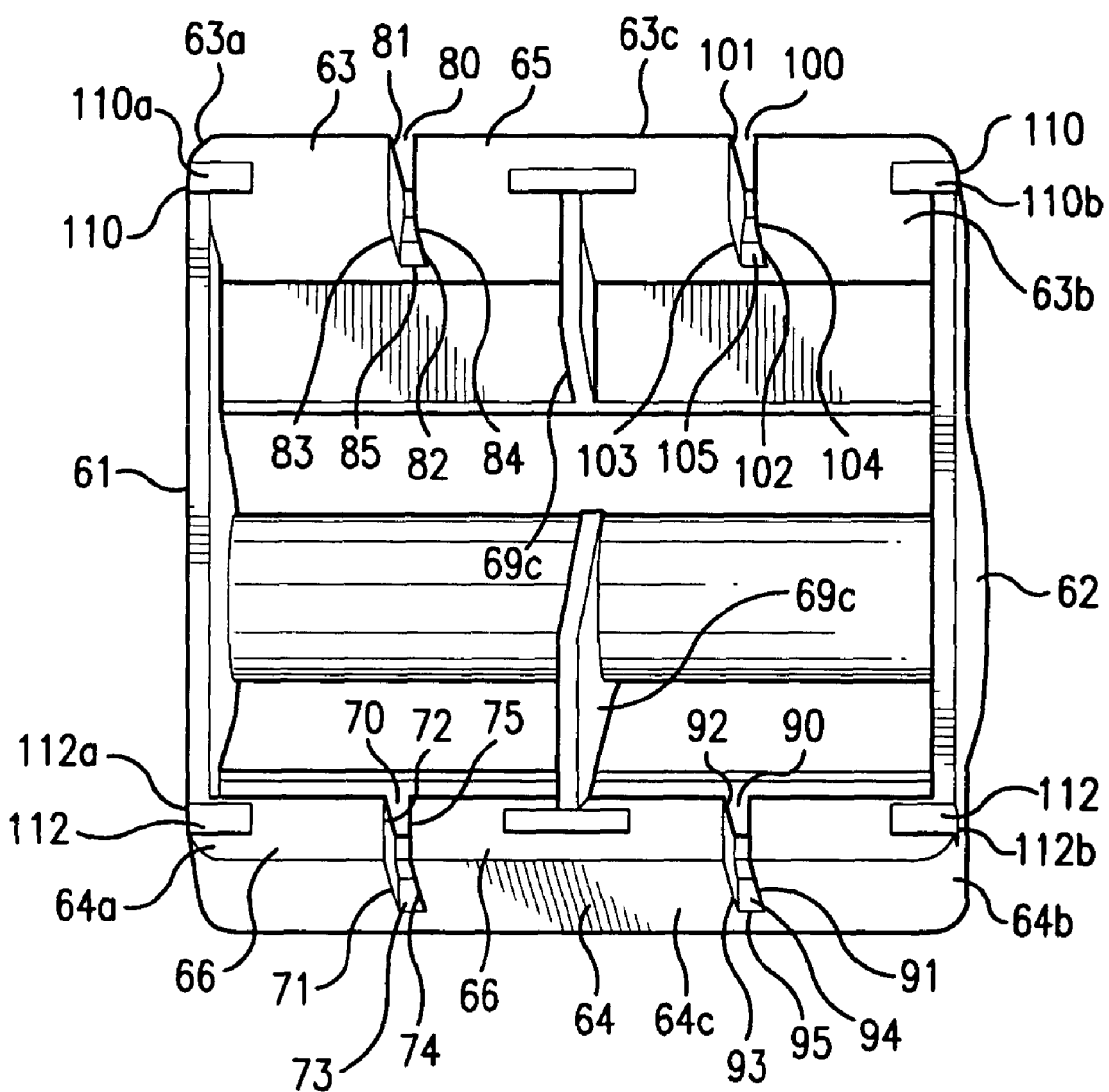
FIG. 7 is another perspective view of the handle of FIG. 6.

Referring now to FIGS. 6 and 7, an alternate embodiment of a handle 60 according to the present invention is shown. The handle 60 is preferably used to facilitate an individual's (or device's) grasping, lifting, handling, and transporting of door and window assemblies (not shown), such as that shown in FIG. 1. Using more than one handle 60 can improve an individual's manipulation of door and window assemblies.

Typically, the handle 60 is made of a plastic material and is injection molded and formed as a unitary member. Alternatively, the handle 10 can be formed of other suitable materials and of separate components and coupled together by suitable means.

The handle comprises a first end 61 and a second end 62. The second end 62 is disposed in facing opposition to the first end 61. Disposed between the first and second ends 61,62 is a first flange 63 and a second flange 64. The first flange 63 comprises a first end 63a, a second end 63b, and a medial portion 63c. The second end 63b is disposed in facing opposition to the first end 63a. The first end 63a is adjacent to the first end 61 of the handle 60 and the second end 63b is adjacent to the second end 62 of the handle 60. The medial portion 63c is disposed between and joins the first and second ends 63a,63b. The medial portion 63c is disposed substantially orthogonal to the first and second ends 61,62 of the handle 60.

The second flange 64 is disposed substantially parallel to the first flange 63. The second flange 64 comprises a first end 64a, a second end 64b, and a medial portion 64c. The second end 64b is disposed in facing opposition to the first end 64a. The first end 64a is adjacent to the first end 61 of the handle 60 and the second end 64b is adjacent to the second end 62 of the handle 60. The medial portion 64c is disposed between and joins the first and second ends 64a,64b. The medial portion 64c is disposed substantially orthogonal to the first and second ends 61,62 of the handle 60. The first and second ends 61,62 and the medial portion 63c of the first flange 63 and the medial portion 64c of the second flange 64 form a perimeter of the handle 60.

The first flange 63 comprises a first surface 65 and a second surface 67. The first and second surfaces 65,67 are disposed in facing opposition, and are substantially parallel to one another. The first flange 63 comprises a substantially rectangular shape.

The first surface 65 is adapted to be coupled to a frame of a door or window assembly. When coupled to the frame, the first surface 65 is disposed adjacent to the frame. In one embodiment, the first surface 65 is disposed substantially contiguous to the frame.

The handle comprises a first channel 70, a second channel 80, a third channel 90, and a fourth channel 100. The first and second channels 70,80 share a common axis (not shown), and are adapted to be coupled with a nailing fin. The third and fourth channels 90,100 share a common axis (not shown), and are adapted to be coupled with the nailing fin.

The first and second channels 70,80 are disposed proximate the first end 61 and the third and fourth channels 90,100 are disposed proximate the second end 62. The first and third channels 70,90 are disposed substantially orthogonal to the second flange 64. The second and fourth channels 80,100 are disposed substantially orthogonal to the first flange 63.

The first channel 70 comprises a first end 71 and a second end 72. The first and second ends 71,72 of the first channel 70 are disposed on opposing sides of the first surface 66 of the second flange 64. The first channel 70 spans substantially continuously from the first end 71 to the second end 72.

The first channel 70 comprises a slot or a groove formed by a first leg 73, a second leg 74, and an intermediate portion 75. The intermediate portion 75 joins the first and second legs 73,74, which are substantially parallel to one another. One side view of the first channel 70 formed by the first leg 73, the second leg 74, and the intermediate portion 75 substantially resembles an elongated u-shape.

A depth of the first channel 70 is sufficient to engage a portion of the nailing fin 4, such that the door or window assembly can be effectively manipulated by an individual grasping the handle 60.

The second channel 80 comprises a first end 81 and a second end 82. The first and second ends 81,82 of the second channel 80 are disposed on opposing sides of the first surface 65 of the first flange 63. The second channel 80 spans substantially continuously from the first end 81 to the second end 82.

The second channel 80 comprises a slot or a groove formed by a first leg 83, a second leg 84, and an intermediate portion 85. The intermediate portion 85 joins the first and second legs 83,84, which are substantially parallel to one another. One side view of the second channel 80 formed by the first leg 83, the second leg 84, and the intermediate portion 85 substantially resembles an elongated u-shape.

A depth of the second channel 80 is sufficient to engage a portion of the nailing fin 4, such that the door or window assembly can be effectively manipulated by an individual or device grasping the handle 60.

The third channel 90 comprises a first end 91 and a second end 92. The first and second ends 91,92 of the third channel 90 are disposed on opposing sides of the first surface 66 of the second flange 64. The third channel 90 spans substantially continuously from the first end 91 to the second end 92.

The third channel 90 comprises a slot or a groove formed by a first leg 93, a second leg 94, and an intermediate portion 95. The intermediate portion 95 joins the first and second legs 93,94, which are substantially parallel to one another. One side view of the third channel 90 formed by the first leg 93, the second leg 94, and the intermediate portion 95 substantially resembles an elongated u-shape.

A depth of the third channel 90 is sufficient to engage a portion of the nailing fin 4, such that the door or window assembly can be effectively manipulated by an individual or device grasping the handle 60.

The fourth channel 100 comprises a first end 101 and a second end 102. The first and second ends 101,102 of the fourth channel 100 are disposed on opposing sides of the first surface 65 of the first flange 63. The fourth channel 100 spans substantially continuously from the first end 101 to the second end 102.

The fourth channel 100 comprises a slot or a groove formed by a first leg 103, a second leg 104, and an intermediate portion 105. The intermediate portion 105 joins the first and second legs 103,104, which are substantially parallel to one another. One side view of the fourth channel 100 formed by the first leg 103, the second leg 104, and the intermediate portion 105 substantially resembles an elongated u-shape.

A depth of the fourth channel 100 is sufficient to engage a substantial depth of nailing fin 4. Alternatively, the depth of the fourth channel 100 is sufficient to engage a portion of the nailing fin 4, such that the door or window assembly can be effectively manipulated by an individual or device grasping the handle 60.

The handle 60 comprises means for securing the nailing fin 4. The securing means is provided in both the first and second ends 61,62. The securing means comprises a first shaft 110 and a second shaft 112. The first shaft 110 is disposed proximate the first surface 65 of the first flange 63. The second shaft 112 is disposed proximate the first surface 66 of the second flange 64. The second shaft 112 is disposed substantially parallel to the first shaft 110.

The first shaft 110 comprises a first end 110a and a second end 110b. The first end 110a is disposed adjacent to the first end 61 of the handle 60. The second end 10b is disposed adjacent to the second end 62 of the handle. Portions of the first shaft 110 penetrate the first surface 65 of the first flange 63. The first shaft 110 traverses the second channel 80 and the fourth channel 100. The first shaft 110 is adapted to receive a fastening element, such as a self-tapping screw (not shown). Typically, the self-tapping screw is of sufficient length to traverse the entire length of the first shaft 110, i.e., from the first end 110a to the second end 110b. Alternatively, the length of the self-tapping screw is sufficient to secure the handle 60 to nailing fin 4.

The second shaft 112 comprises a first end 112a and a second end 112b. The first end 112a is disposed adjacent to the first end 61 of the handle 60. The second end 112b is disposed adjacent to the second end 62 of the handle. Portions of the second shaft 112 penetrate the first surface 66 of the second flange 64. The second shaft 112 traverses the first channel 70 and the third channel 90. The second shaft 112 is adapted to receive a fastening element, such as a self-tapping screw. Typically, the self-tapping screw is of sufficient length to traverse the entire length of the second shaft 112, i.e., from the first end 112a to the second end 112b. Alternatively, the length of the self-tapping screw is sufficient to secure the handle 60 to nailing fin 4.

The nailing fin 4 is typically disposed in the first channel 70 and second channel 80 or the third channel 90 and the fourth channel 100. The multiple channels are provided such that the handle 60 is not limited to a right-handed application only or a left-handed application only. Thus, the handle 60 can be used in a wide variety of configurations of door and window assemblies.

The handle 60 also comprises a grip 69. The grip 69 is adapted to be grasped by an individual or a suitable grasping or attaching device, such as for example, a hook or a tied rope. As shown in FIG. 6, the grip 69 is substantially cylindrical-shaped. The grip 69 also may include pre-formed ridges (not shown) or grooves (not shown) to improve grasping by a hand or attachment by a device.

The grip 69 is formed of the same material and as a unitary element of the handle 60. The grip 69 can be formed of other suitable materials and separately from the handle 60, and attached to the handle 60 using suitable attaching means.

The grip 69 is disposed substantially orthogonal to the plurality of channels, i.e., the first channel 70, the second channel 80, the third channel 90 and the fourth channel 100. The grip comprises a first end 69*a* and a second end 69*b*. The first end 69*a* is coupled with the first end 61 of the handle 60 and the second end 69*b* is coupled with the second end 62 of the handle 60.

A grip brace 69*c* is disposed between the first end 61 of the handle and the second end 62 of the handle 60. The grip brace 69*c* is coupled with and joins the grip 69, the first flange 63, and the second flange 64. The grip brace 69*c* provides the grip 69 with sufficient dimensional stability to permit effective manipulation of a door or window assembly.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. A system comprising:
   one of a door frame and a window frame comprising a nailing fin; and
   a handle comprising a flange comprising a first surface and a second surface and a channel extending from the flange, the first surface removably engaging the frame, the channel removably receiving and engaging the nailing fin for carrying the frame via the nailing fin.

2. The system of claim 1, wherein the frame comprises a vinyl door frame.

3. The system of claim 1, wherein the frame comprises a vinyl window frame.

4. The system of claim 1, wherein the flange further comprises a first end and a second end, the channel disposed proximate the first end and substantially orthogonal to the flange.

5. The system of claim 4, wherein the channel comprises a first channel, the handle further comprising a second channel, the second channel disposed proximate the second end of the flange and substantially parallel to the first channel, the second channel adapted to be coupled with the nailing fin.

6. The system of claim 1, wherein the channel comprises means for securing the nailing fin.

7. The system of claim 1, wherein the handle further comprises a grip disposed substantially orthogonal to the channel.

8. A method of carrying with a handle a frame of a door or a window, the handle comprising a flange comprising a first surface and a second surface, the method comprising:
   engaging the first surface with the frame; and
   engaging a nailing fin of the frame within a channel of the handle, the channel extending from the flange, wherein the frame is carried via the nailing fin.

9. The method of claim 8, wherein the flange further comprises a first end and a second end, the channel disposed proximate the first end.

10. The method of claim 8, wherein the channel comprises a first end and a second end, the channel disposed substantially orthogonal to the flange.

11. The method of claim 8, wherein the handle comprises means for securing the channel and the nailing fin.

12. The method of claim 8, wherein the handle comprises a grip disposed substantially orthogonal to the channel.

13. The method of claim 8, wherein the frame comprises a vinyl door frame.

14. The method of claim 8, wherein the frame comprises a vinyl window frame.

* * * * *

UNITED STATES PATENT AND TRADEMARK OFFICE
CERTIFICATE OF CORRECTION

| | | |
|---|---|---|
| PATENT NO. | : 7,003,917 B2 | Page 1 of 1 |
| APPLICATION NO. | : 10/670962 | |
| DATED | : February 28, 2006 | |
| INVENTOR(S) | : Hetherington et al. | |

It is certified that error appears in the above-identified patent and that said Letters Patent is hereby corrected as shown below:

In column 10, line 28, the first occurrence of --10b -- should read -- 110b --.

Signed and Sealed this

Twenty-second Day of August, 2006

JON W. DUDAS
*Director of the United States Patent and Trademark Office*